US009661431B2

United States Patent
Park et al.

(10) Patent No.: US 9,661,431 B2
(45) Date of Patent: May 23, 2017

(54) AUDIO DEVICE AND METHOD OF RECOGNIZING POSITION OF AUDIO DEVICE

(71) Applicant: SAMSUNG ELECTRONICS CO., LTD., Suwon-si, Gyeonggi-do (KR)

(72) Inventors: Chan-ho Park, Seongnam-si (KR); Kyeong-chae Lim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/084,708

(22) Filed: Mar. 30, 2016

(65) Prior Publication Data

US 2016/0345112 A1 Nov. 24, 2016

(30) Foreign Application Priority Data

May 18, 2015 (KR) .......................... 10-2015-0069116

(51) Int. Cl.
*H04R 29/00* (2006.01)
*G06F 3/16* (2006.01)
*H04R 5/04* (2006.01)

(52) U.S. Cl.
CPC ........... *H04R 29/001* (2013.01); *G06F 3/165* (2013.01); *H04R 5/04* (2013.01)

(58) Field of Classification Search
CPC .......... H04R 29/001; H04R 5/04; G06F 3/165
See application file for complete search history.

(56) References Cited

U.S. PATENT DOCUMENTS

| | | | | |
|---|---|---|---|---|
| 8,462,967 B2 * | 6/2013 | Lowe | ....................... | H04N 5/60 345/156 |
| 8,879,761 B2 * | 11/2014 | Johnson | .................... | H04R 3/12 345/659 |
| 9,258,407 B2 * | 2/2016 | Liu | .................... | H04W 52/0254 |
| 9,357,309 B2 * | 5/2016 | Meyer | ..................... | G06F 3/165 |
| 2011/0002487 A1 * | 1/2011 | Panther | ................. | H04R 5/04 381/300 |
| 2011/0316768 A1 * | 12/2011 | McRae | ................... | G06F 3/165 345/156 |
| 2014/0233771 A1 * | 8/2014 | Giustina | .................. | H04R 5/04 381/304 |
| 2014/0233772 A1 * | 8/2014 | Giustina | .................. | H04R 5/04 381/306 |
| 2015/0208188 A1 * | 7/2015 | Carlsson | .............. | H04R 29/001 381/79 |

FOREIGN PATENT DOCUMENTS

KR        10-1461968         11/2014

* cited by examiner

*Primary Examiner* — Brenda Bernardi
(74) *Attorney, Agent, or Firm* — Nixon & Vanderhye, P.C.

(57) ABSTRACT

An audio device and a position recognition method of the audio device are disclosed. According to an example embodiment, an audio device includes at least one infrared (IR) transceiver and a controller configured to recognize whether the audio device is positioned to a left or right of another audio device in response to a signal received by the at least one IR transceiver.

11 Claims, 19 Drawing Sheets

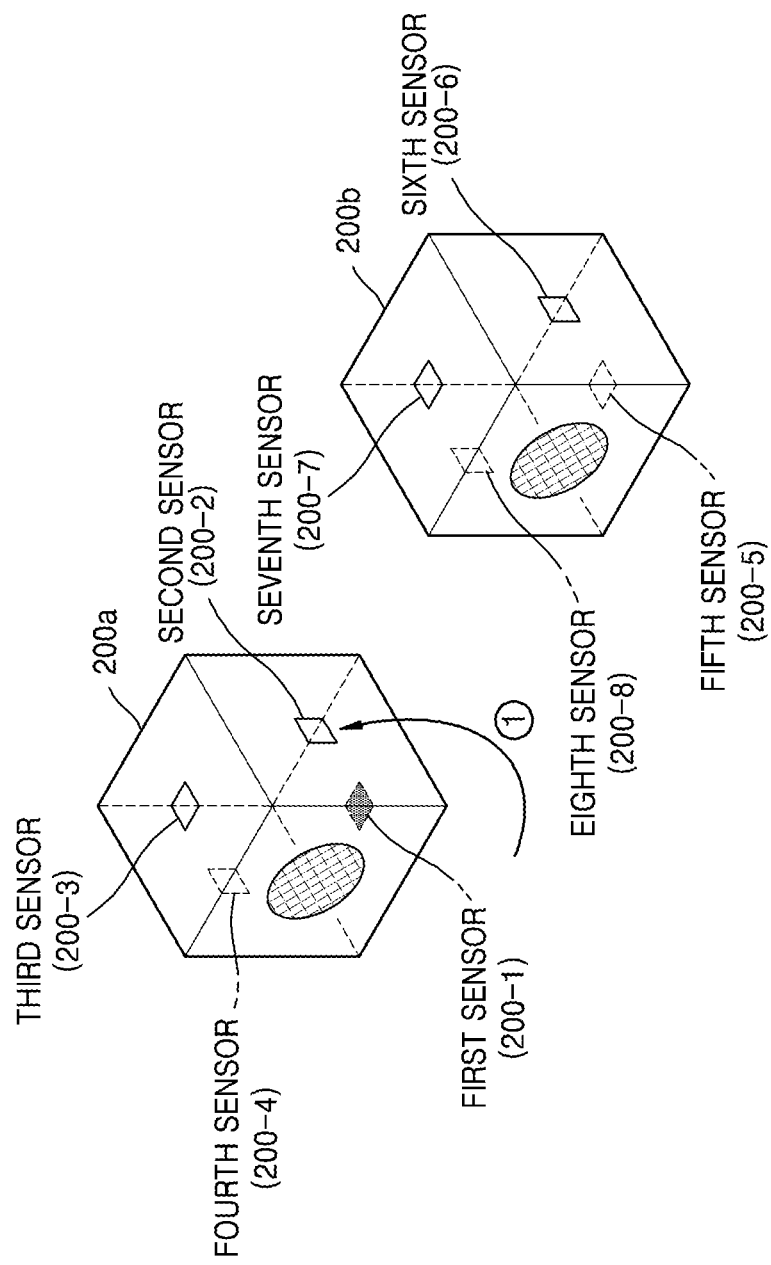

FIG. 10A (A) FIRST SETTING TABLE 1000

| CHANGE IN STATE OF BOTTOM IR SENSOR | INPUT SOURCE |
|---|---|
| FIRST STATE CHANGE | TV |
| SECOND STATE CHANGE | SMART DEVICE |
| THIRD STATE CHANGE | BT READY |
| FOURTH STATE CHANGE | INTERNET RADIO |

FIG. 10B (B) SECOND SETTING TABLE 1010

| CHANGE IN STATE OF BOTTOM IR SENSOR | SOUND STAGE |
|---|---|
| FIRST STATE CHANGE | VOICE |
| SECOND STATE CHANGE | MUSIC |
| THIRD STATE CHANGE | MOVIE |
| FOURTH STATE CHANGE | 3D SOUND |

AUDIO DEVICE AND METHOD OF RECOGNIZING POSITION OF AUDIO DEVICE

CROSS-REFERENCE TO RELATED APPLICATION

This application is based on and claims priority under 35 U.S.C. §119 to Korean Patent Application No. 10-2015-0069116, filed on May 18, 2015, in the Korean Intellectual Property Office, the disclosure of which is incorporated by reference herein in its entirety.

BACKGROUND

1. Field

The disclosure relates generally to an audio device and a method of setting the audio device, and for example, to an audio device in which a left side and a right side of the audio device may be simply set, and a method of setting the audio device.

2. Description of Related Art

Audio devices (e.g., speakers, a sound bar, a home theater, etc.) that support a wireless connection in addition to a wired connection have been increasing. Wireless audio devices may provide a variety of audio content to users through a codec that supports wireless convenience and high sound quality.

Stereophonic sound is a method of sound reproduction for providing directionality. This is achieved by using two or more independent audio channels through two or more speakers in such a way as to create the impression of sound heard from various directions. For example, for two-channel speakers, a left speaker may be set to output left audio channel sound and a right speaker may be set to output right audio channel sound. Accordingly, there is an inconvenience that a user may position two speakers and then need to manually set which speaker operates as the left speaker and which speaker operates as the right speaker in order to set left and right channels.

Furthermore, for wireless speakers, the user may freely move and use the speaker in nature. However, on a condition that a left speaker and a right speaker need to be set manually, there is an inconvenience that the left speaker and the right speaker need to be set again whenever the user freely moves and uses the wireless speaker. For example, when the user moves a speaker from a living room to a master bedroom and positions the speaker next to another speaker that operated in the master bedroom in a mono mode, the other speaker that operated in the master bedroom in the mono mode may operate in a stereo mode together with the newly moved speaker. For the stereo mode operation, however, the user needs to perform an operation of setting the originally positioned speaker and the newly positioned speaker as a left speaker and a right speaker.

SUMMARY

An audio device in which left and right position settings are performed not manually but automatically, and a position recognition method thereof are provided.

Additional aspects will be set forth in part in the description which follows and, in part, will be apparent from the description.

According to an aspect of an example embodiment, an audio device includes at least one infrared (IR) transceiver and a controller configured to recognize whether the audio device is positioned to a left or right of another audio device in response to a signal received by the at least one IR transceiver.

The audio device may further include a movement sensor configured to sense movement of the audio device, and the controller may be configured to turn on the at least one IR transceiver in response to a signal indicating that the movement sensor senses the movement.

The at least one IR transceiver may include a first IR transceiver and a second IR transceiver, and the controller may be configured to recognize that the audio device is positioned on a bottom surface using the first IR transceiver positioned on the bottom surface, and may be configured to recognize that the audio device is positioned to a left or right of the other audio device using the second IR transceiver receiving a signal.

The controller may be configured to change settings of a function of the audio device in response to a change in a state of a signal sensed by the first IR transceiver positioned on the bottom surface.

The function may include one or more of a change of an input source, a change of a sound stage, and a volume up/down of the audio device.

According to an aspect of another example embodiment, a position recognition method of an audio device includes receiving a signal by at least one infrared (IR) transceiver included in the audio device and recognizing that the audio device is positioned to a left or right of another audio device in response to the received signal.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIGS. 9A to 9D are diagrams illustrating an example function changing method of an audio device illustrated in FIG. 8;

FIGS. 10A and 10B illustrate example function setting tables;

DETAILED DESCRIPTION

Figure 1:
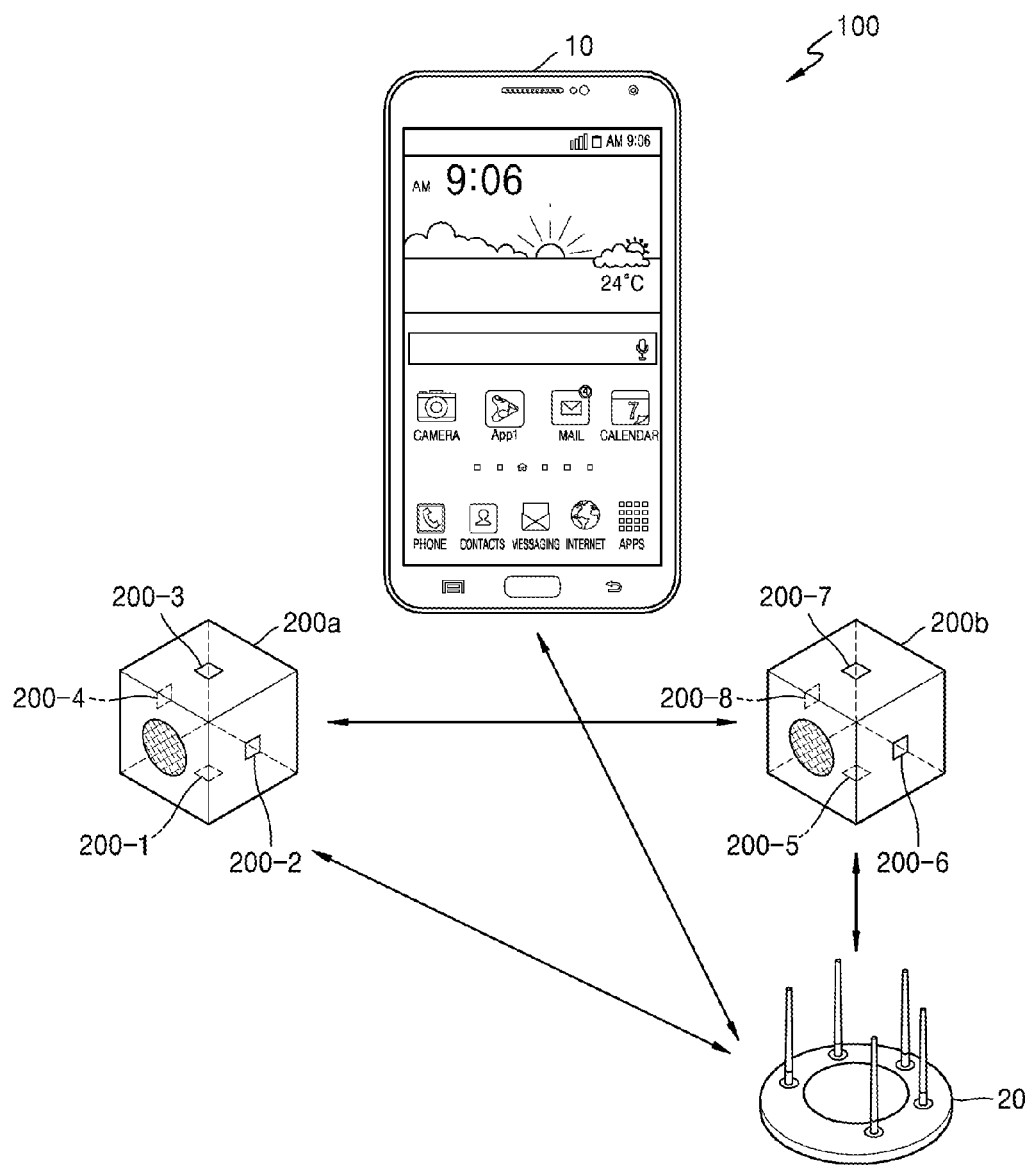
FIG. 1 is a diagram illustrating an example concept of an audio system.

Hereinafter, example embodiments of the disclosure will be described in greater detail with reference to the accompanying drawings. Further, a method of configuring and using an electronic device according to an example embodiment will be described in greater detail with reference to the accompanying drawings. Like reference numerals refer to like elements throughout. As used herein, the term "and/or" includes any and all combinations of one or more of the associated listed items. Expressions such as "at least one of," when preceding a list of elements, modify the entire list of elements and do not necessarily modify the individual elements of the list.

Although the terms "first," "second," etc., may be used herein to describe various elements, these elements should not be limited by these terms. The above terms may be used only to distinguish one component from another. For example, a first element may be called a second element, and a second element may also be called a first element without departing from the scope of the disclosure. The term "and/or" may refer to any one or a combination of a plurality of related items.

The terminology used herein is for the purpose of describing particular example embodiments only, and is not intended to limit the scope of the present disclosure. An expression used in the singular encompasses the expression of the plural, unless it has a clearly different meaning in context. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or a combination thereof.

FIG. 1 is a diagram illustrating an example concept of an audio system.

Referring to FIG. 1, an audio system 100 includes, for example, an electronic device 10, audio devices 200a and 200b, and an access point 20.

The audio devices 200a and 200b may be connected to the access point 20 or the electronic device 10 over a network. The audio devices 200a and 200b may, for example, output audio received from the access point 20 or the electronic device 10 that is wirelessly connected thereto.

According to an example embodiment, at least two or more audio devices 200a and 200b may be formed in the shape of, for example, a hexahedron, and radio waves may be transmitted from and received by, for example, four surfaces of the hexahedron. A radio transceiving sensor may, for example, be installed in an upper surface, a bottom surface, a left surface, and a right surface of each of the audio devices 200a and 200b. For example, the audio device 200a may include radio transceiving sensors 200-1, 200-2, 200-3, and 200-4. The audio device 200b may include radio transceiving sensors 200-5, 200-6, 200-7, and 200-8. When the audio device 200a and the audio device 200b are positioned near each other, the audio device 200a may recognize that the audio device 200b is positioned at a right or left side of the audio device 200a through the radio transceiving sensors included therein, and the audio device 200b may recognize that the audio device 200a is positioned at a left or right side of the audio device 200b through the radio transceiving sensors included therein. Thus, each of the audio devices 200a and 200b may recognize whether it is a left device or a right device. In addition, the audio devices 200a and 200b may be configured to change functional settings for the audio devices 200a and 200b using a state variation of a radio transceiving sensor included therein.

Although a sound output part of each audio device of FIG. 1 is illustrated as being disposed at one surface of the hexahedron, example embodiments of the present disclosure are not limited thereto. The sound output part may be disposed at one or more sides of the hexahedron. In addition, it should be appreciated that the audio device may be implemented as a non-directional audio device by, for example, making a groove around the audio device and outputting sound through the groove.

Figure 2:
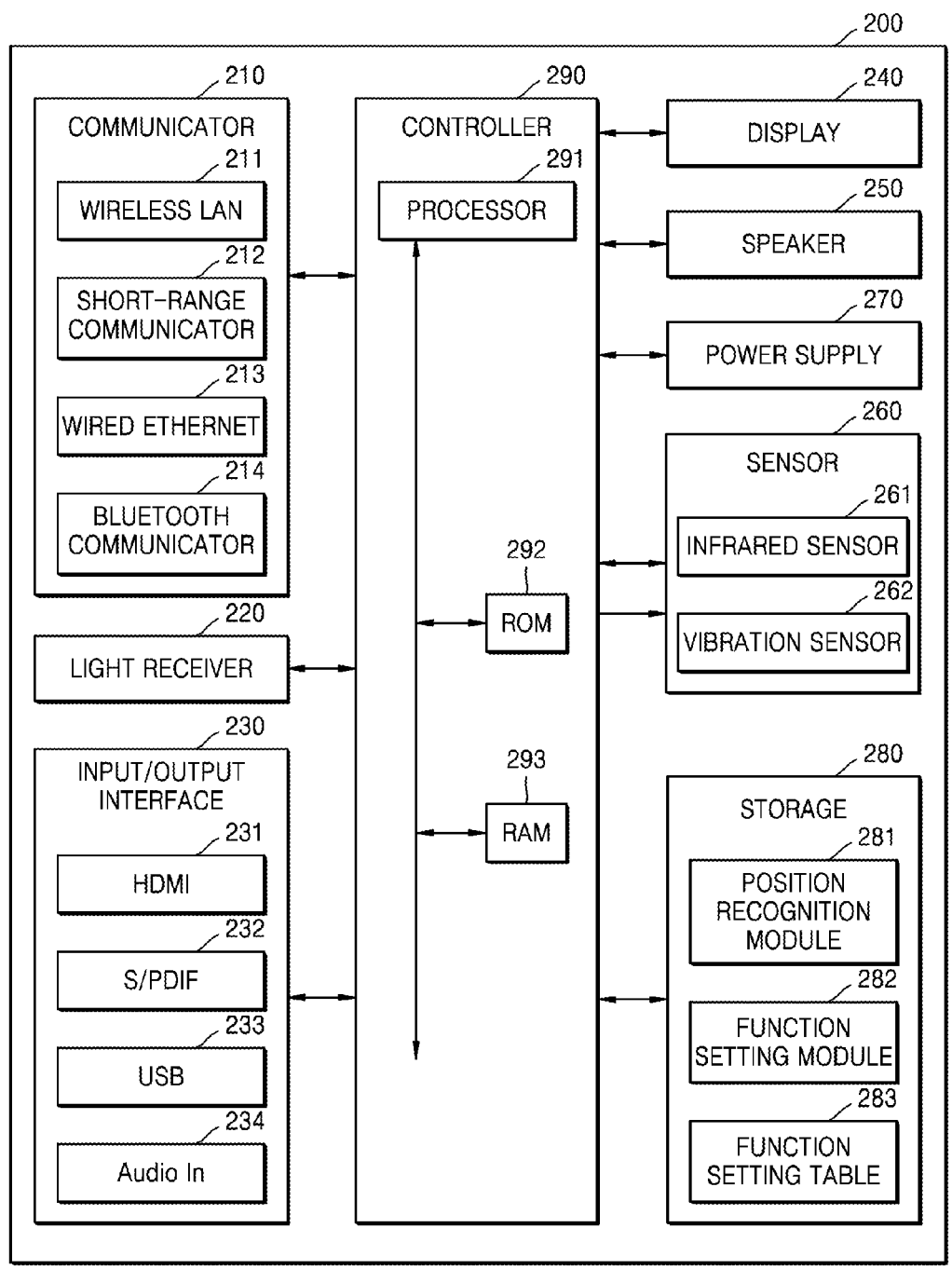
FIG. 2 is a block diagram illustrating an example audio device.

FIG. 2 is a block diagram illustrating an example audio device 200.

The audio device 200 may include a communicator (e.g., including communication circuitry) 210, a light receiver 220, an input/output interface (e.g., including input/output circuitry) 230, a display (e.g., including a display panel and/or display driving circuitry) 240, a speaker 250, a sensor 260, a power supply 270, a storage (e.g., a memory) 280, and a controller (e.g., including processing circuitry) 290, but is not limited thereto. As necessary, the above-described any functional element may not be included, or another functional element may be additionally included. One function element may be combined, for example, with another function element in the form of a system-on-chip (SoC).

The communicator 210 may be wirelessly connected with an external electronic device 10 or an access point 20 under the control of the controller 290. The communicator 210 may include, for example, at least one of a wireless LAN 211, a short-range communicator (e.g., short range communication circuitry) 212, a wired Ethernet 123, and a Bluetooth communicator (e.g., Bluetooth circuitry) 214. The communicator 210 may receive a control signal from the access point 20 or the electronic device 10 under the control of the controller 290. In addition, the communicator 210 may receive audio data corresponding to audio from the access point 20 or the electronic device 10 under the control of the controller 290. Although it is illustrated that the Bluetooth communicator 214 is present separately from the short-range communicator 212, it should be appreciated that the Bluetooth communicator 214 may be included in the short-range communicator 212.

According to an example embodiment, the Bluetooth communicator 214 of the communicator 210 may include a Bluetooth Low Energy (BLE) module, and the BLE module may recognize another audio device adjacent to or within a detectable proximity of the audio device 200. For example, an infrared (IR) sensor included in the audio device 200 may be turned off normally and may be turned on when the BLE module recognizes another audio device. It is possible to save power consumption of the audio device 200 by turning off the IR sensor normally and turning on the IR sensor only when left and right settings of the audio device are needed. Although the BLE module is a module that is always turned on, the BLE module consumes relatively little power as compared to the IR sensor.

The light receiver 220 may receive an optical signal (including a control signal) from a remote controller (not shown) through an optical window (not shown). The light receiver 220 may receive an optical signal corresponding to a user input (e.g., a touch, press, touch gesture, voice, or motion) from the remote controller (not shown). The received optical signal may be converted and then transmitted to the controller 290. In addition, a control signal may be extracted by the controller 290 from the received optical signal. The light receiver 220 may be integrated with an IR sensor 261 included in the sensor 260 or may be provided separately.

The input/output interface 230 may receive audio data corresponding to audio (e.g., sound, music, etc.) from the outside under the control of the controller 290. The input/output interface 230 may receive video data corresponding to video from the outside under the control of the controller 290. In addition, the input/output interface 230 may output the audio data corresponding to the audio (e.g., sound, music, etc.) to the outside under the control of the controller 290. The input/output interface 230 may output the video data corresponding to the video to the outside under the control of the controller 290. The input/output interface 230 may include, for example, a high-definition multimedia interface (HDMI) port 231, a Sony/Phillips Digital Interface Format (S/PDIF) port 232, a Universal Serial Bus (USB) port 233, and/or an audio-in jack 234. It should be readily understood by those skilled in the art that the configuration and operation of the input/output interface 230 may be implemented in various ways and is not limited to the arrangement illustrated in this example embodiment of the present disclosure.

The display 240 may display video or text information (e.g., a song title, a volume, or a sound output effect) under the control of the controller 290. The display 240 may include, for example, a liquid crystal display (LCD), an organic light emitting diode (OLED), a plasma display panel (PDP), or a vacuum fluorescent display (VFD), or the like.

When a USB memory (not shown), which is a type of memory card, is connected to the audio device 200 through, for example, the USB port 233, the display 240 may display <USB ready> or <Song title> under the control of the controller 290. When the electronic device 10 is connected to the audio device 200 by short-range communication, the display 240 may display a text of <BT connected> or <NFC connected> under the control of the controller 290.

The speaker 250 is configured to output the received audio under the control of the controller 290. The speaker 250 may output the received audio (including, for example, voice, music, sound, or audio streaming) through the communicator 210 or the input/output interface 230. The speaker 250 may be implemented as a 1-channel, 2-channel, or 2.1-channel speaker, or the like. It should be readily understood by those skilled in the art that the speaker 250 may be implemented as a 4-channel, 4.1-channel, 5.1-channel, 6.1-channel, 7.1-channel, 9.1-channel, or 11.2-channel speaker, but example embodiments of the present disclosure are not limited thereto. The controller 290 may be configured to provide the user with various audio output effects (for example, movie, sports, rock concert hall, an orchestra hall, etc.) corresponding to the number of speakers 250. In addition, the controller 290 may be configured to provide the user with various audio output effects (for example, movie, sports, rock concert hall, an orchestra hall, etc.) corresponding to the total number of speakers 250 and additional speakers connected through the input/output interface 230.

The speaker 250 may output an audio stored in the storage 280 under the control of the controller 290. In addition, the audio device 200 may output the audio to an external electronic device (not shown) through the input/output interface 230. For example, the controller 290 may be configured to output the audio to an additional speaker or the electronic device 10.

The sensor 260 may sense the movement of the audio device 200 or the presence of another audio device positioned in the vicinity of the audio device 200. The sensor 260 may include, for example, the IR sensor 261 and a vibration sensor 262.

The IR sensor 261 is a device that uses infrared rays to detect a physical quantity or a chemical quantity such as temperature or radiation intensity and converts the quantity into an electric quantity or electrical signal on which signal processing may be performed. The IR sensor 261 includes a light emitting sensor that emits light with a certain frequency and a light receiving sensor that receives the light emitted by the light emitting sensor. The light emitting sensor may be a device having similar properties to, for example, an LED. The light receiving sensor has a similar structure to a transistor and includes a light receiving part. Depending on the amount of light received by the light receiving sensor, the resistance value of the light receiving sensor may change and thus the amount of electric current that flows from a collector to an emitter may change. The light receiving sensor determines whether the light is received based on the change in the electric current.

According to an example embodiment, when the IR sensor 261 is positioned on a bottom surface of the audio device 200, the IR sensor 261 may not sense light through the light receiving sensor. Accordingly, a state value of the IR sensor 261 positioned on the bottom surface may be represented as a first value. For example, when the state value of the IR sensor 261 is the first value, the audio device 200 may recognize that the audio device is positioned on the bottom surface.

According to an example embodiment, when the IR sensor 261 is positioned on the bottom surface, and is then positioned on a side surface by rotating the audio device 200, the state value of the IR sensor 261 may be changed, for example, from the first value to a second value. Accordingly, the audio device 200 may recognize that the audio device 200 has been rotated, for example, by 90 degrees, on the basis of the change in the state value of the IR sensor 261 that was positioned on the bottom surface.

According to an example embodiment, four IR sensors may be installed in the audio device 200. In this example, a movement sensor may be used to reduce power consumption of the IR sensor 261. For example, the four IR sensors may be turned off normally and be turned on when the movement sensor senses any movement. When the IR sensors are maintained in a stable state, the IR sensors may be turned off again.

According to an example embodiment, the four IR sensors may be installed in the audio device 200. In this example, the BLE module of the Bluetooth communicator 214 of the audio device 200 may be used to reduce power consumption of the IR sensor 261. For example, the four IR sensors may be turned off normally and may be turned on when one audio device senses another audio device through BLE communication. When the IR sensors are maintained in a stable state, the IR sensors may be turned off again.

According to an example embodiment, the audio device 200 may include at least one IR sensor 261.

According to an example embodiment, the audio device 200 may recognize that there is another audio device in the vicinity of the audio device 200 using an IR sensor positioned on a side surface of the audio device 200.

One of a plurality of IR sensors may recognize whether the audio device 200 is positioned on the bottom surface. One of the plurality of IR sensors may recognize whether there is another audio device in the vicinity of the audio device 200.

According to an example embodiment, as illustrated in FIG. 1, IR sensors 200-1 to 200-8 may be installed in or on four surfaces of an audio device 200*a* and four surfaces of an audio device 200*b*, both of which have, for example, a hexahedral shape.

Figure 11:
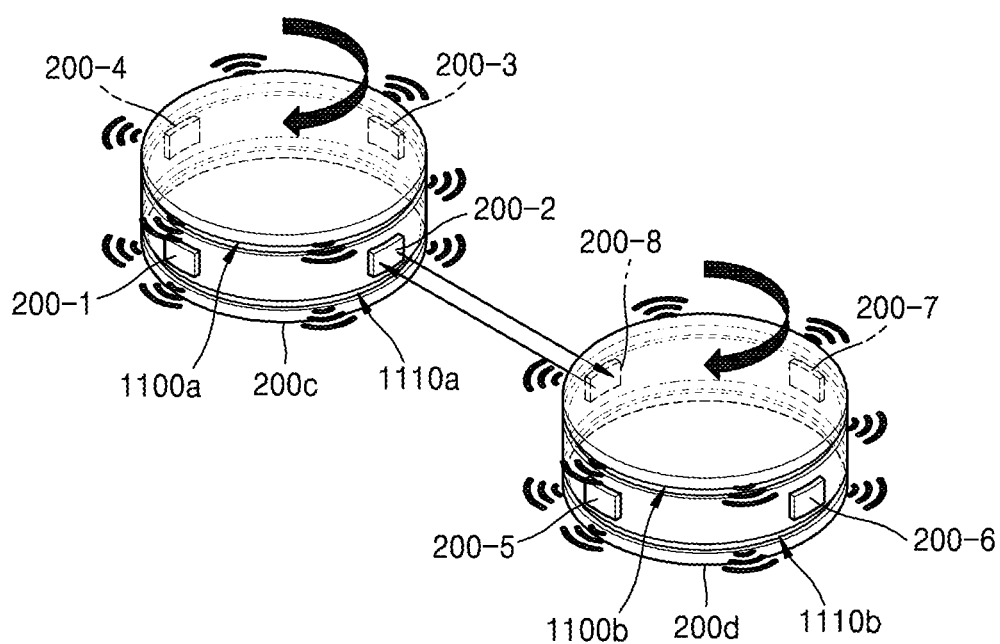
FIG. 11 is a diagram illustrating an example audio device.

According to an example embodiment, as illustrated in FIG. 11, the IR sensors 200-1 to 200-8 may be installed in four directions of an audio device 200*c* and four directions of an audio device 200*d*, both of which have a substantially circular shape. Two or three IR sensors may be installed in the audio device 200*c* or 200*d* having a substantially circular shape.

The vibration sensor 262 is a sensor for sensing a vibration of the audio device 200. The power consumption of an IR sensor that is always turned on, due to the characteristics of a wireless audio device, may become a problem. In consideration of this, it is possible to reduce the power consumption by turning off at least one or more of the plurality of IR sensors and turning on the IR sensors when the IR sensors need to operate, instead of always leaving the IR sensors on. In this example, the time at which the IR sensors need to operate may be considered as a time at which a vibration is sensed by the vibration sensor 262. The time at which the IR sensors need to operate may, for example, be a time at which a user moves the audio device 200, and the movement of the audio device 200 may be easily sensed by the vibration sensor 262. In addition, a time at which the user starts to move the audio device 200 may also be determined by using temperature sensor, a touch sensor, etc.

The power supply 270 supplies power input from an external power source to internal elements 210 to 280 inside the audio device 200 under the control of the controller 290. In addition, the power supply 270 may supply power output from one or more batteries (not shown) positioned inside the audio device 200 to the internal elements 210 to 280 under the control of the controller 290.

According to an example embodiment, the power supply 270 may continuously supply power to the plurality of IR sensors installed in the audio device 200.

According to an example embodiment, the power supply 270 may continuously supply power to only two of the plurality of IR sensors installed in the audio device 200, that is, an IR sensor that is positioned on the bottom surface of the audio device 200 and an IR sensor that is positioned on the side surface and has recognized another audio device, and may not continuously supply power to the other IR sensors.

According to an example embodiment, the power supply 270 may not supply power to the plurality of IR sensors, but may supply power to the plurality of IR sensors when movement is sensed by the movement sensor included in the audio device 200 or when a command for operating an audio device sensor is entered by a user.

According to an example embodiment, the power supply 270 may not supply power to the plurality of IR sensors, but may supply power to the IR sensors when a command for operating the IR sensors of the audio device is entered by the user.

According to an example embodiment, a user input to operate the IR sensors of the audio device may be used as, for example, an input for supplying power to the IR sensors using a temperature difference that is sensed by a temperature sensor included in the audio device when the user holds the audio device.

According to an example embodiment, the user input to operate the IR sensors of the audio device may be used as, for example, an input for supplying power to the IR sensors using a pressure difference that is sensed by a pressure sensor included in the audio device when the user holds the audio device.

According to an example embodiment, the user input to operate the IR sensors of the audio device may be used as an input for supplying power to the IR sensors using a command for operating the IR sensors that is transmitted through wireless communication by an external device such as the electronic device 10 illustrated in FIG. 1. For example, the user may use an app installed in the electronic device 10 to instruct to supply power of the IR sensors of the audio device.

The storage 280 may store a variety of data or control programs for driving and controlling the audio device 200 under the control of the controller 290. The storage 280 may store signals or data that are input or output corresponding to the driving of the communicator 210, the light receiver 220, the input/output interface 230, the display 240, the built-in speaker 250, and the power supply 270.

The storage 280 may include a nonvolatile memory, a volatile memory, a hard disk drive (HDD), or a solid state drive (SSD).

According to an example embodiment, the storage 280 may include a position recognition module (e.g., a program executed by the controller 290) 281 and a function setting module (e.g., a program executed by the controller 290) 282. The position recognition module 281 may use the IR sensor of the sensor 260 to recognize whether the audio device 200 is positioned to the left or right. The function setting module 282 may set functions of the audio device 200 using a function setting table 283 and the change in state of the IR sensor of the sensor 260. As illustrated in FIGS. 10A and 10B the function setting table 283 may include, for example, a first function setting table and a second function setting table.

The controller 290 may include, for example, a processor (e.g., a CPU, GPU, etc.) 291. The controller 290 may include the processor 291 and a read only memory (ROM) 292 that is used to store a control program for controlling the audio device 200. In addition, the controller 290 may include the processor 291, the ROM 292, and a random access memory (RAM) 293 that is used to store signals or data input from the outside of the audio device 200 and is used as a storage area corresponding to various tasks. The controller 290 may also include an audio codec (not shown).

The controller 290 is configured to perform a function of controlling the overall operation of the audio device 200 and to control a signal flow between the internal elements 210 to 280 of the audio device 200, and a data processing function. The controller 290 is configured to control power supplied from the power supply 270 to the internal elements 210 to 280.

The controller 290 may be configured to output received audio through the speaker 250. In addition, the controller 290 may be configured to output the received audio to an additional speaker (not shown) through the communicator 210 or the input/output interface 230.

According to an example embodiment, the controller 290 may be configured to use the position recognition module 281 stored in the storage 280 to recognize whether the audio device 200 is positioned to the left or right.

According to an example embodiment, the controller 290 may be configured to use the function setting module 282 stored in the storage 280 to set a function corresponding to the rotation of the audio device 200. The rotation may be sensed based on, for example, the change in state of a signal sensed by the IR sensor that was positioned on the bottom surface of the audio device 200.

It should be readily understood by those skilled in the art that a configuration and an operation of the controller 290 may be implemented in various ways according to an example embodiment of the present disclosure.

At least one element may be added to or deleted from the elements (e.g., 210 to 290) of the audio device 200 illustrated in FIG. 2 on the basis of the performance of the audio device 200. It should be readily understood by those skilled in the art that positions of the elements (e.g., 210 to 290) may be changed corresponding to the performance or structure of the audio device 200.

Figure 3:
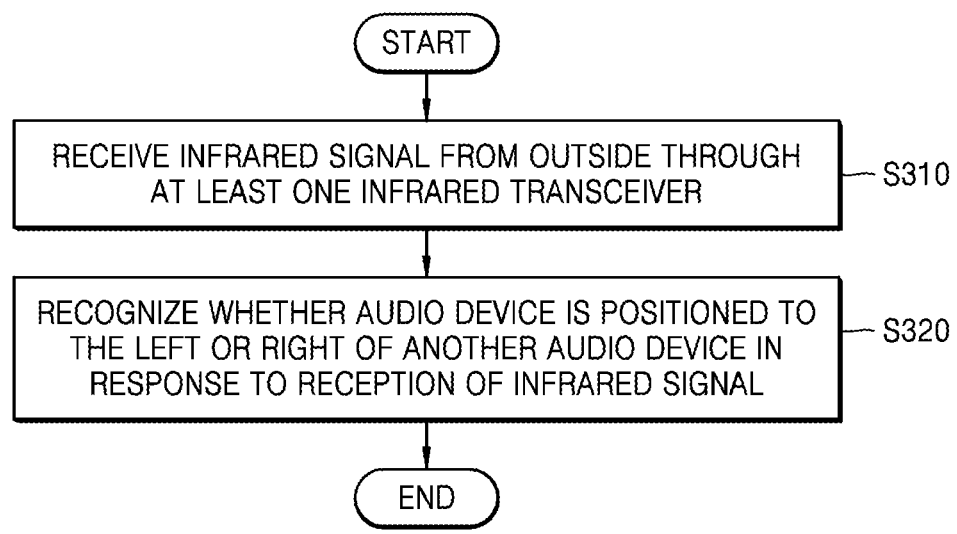
FIG. 3 is a flowchart illustrating an example position recognition method of an audio device.

FIG. 3 is a flowchart illustrating an example position recognition method of an audio device.

Referring to FIG. 3, in step S310, an audio device 200 receives an IR signal from the outside through at least one IR transceiver.

For example, an IR sensor 261 of a sensor 260 of the audio device 200 senses a signal from the outside.

Figure 5:
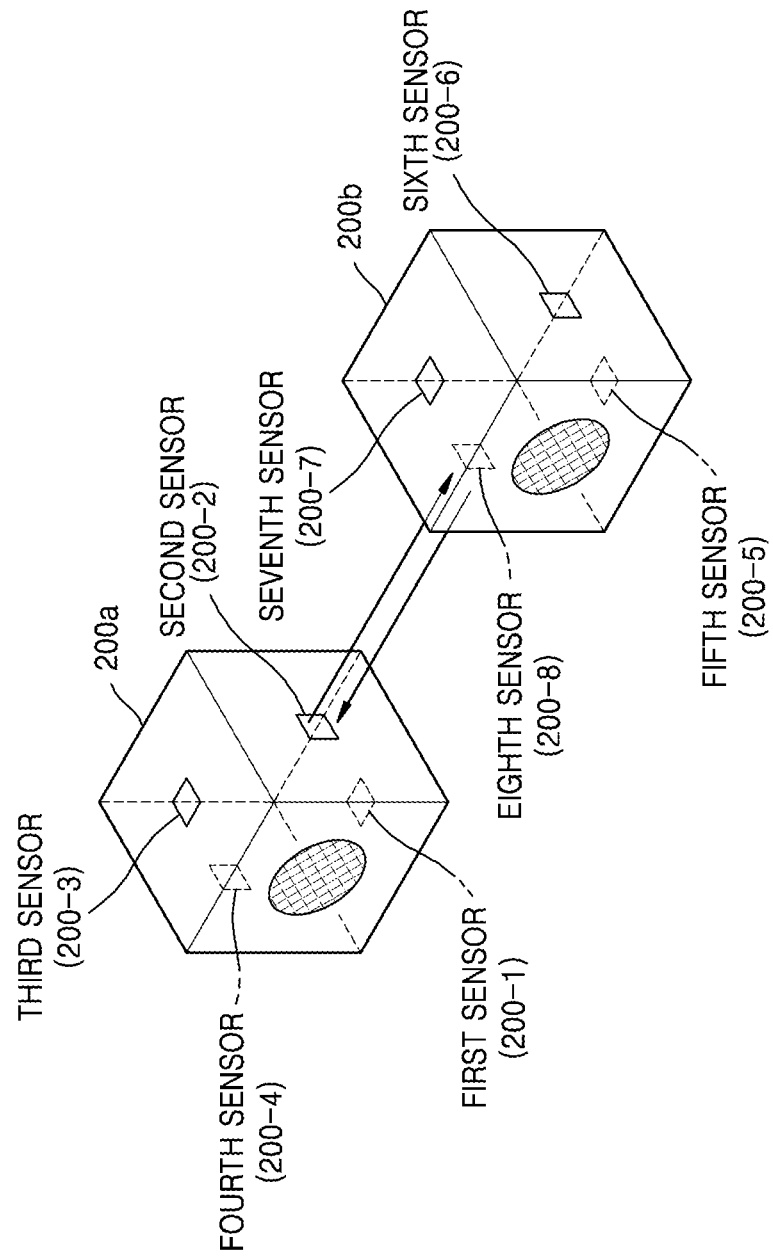
FIG. 5 is a diagram illustrating an example position recognition method of an audio device illustrated in FIG. 4.

Referring to FIG. 5, for example, a first audio device 200a may include IR sensors 200-1 to 200-4 positioned in/on four surfaces of a hexahedron, and a second audio device 200b may include IR sensors 200-5 to 200-8 in/on four surfaces of a hexahedron. A second sensor 200-2 out of the IR sensors of the audio device 200a, for example, emits light and also receives light reflected by the audio device 200b. An eighth sensor 200-8 out of the IR sensors of the audio device 200b, for example, emits light and also receives light reflected by the audio device 200a.

In step S320, the audio device 200 recognizes whether the audio device is positioned to the left or right of another audio device in response to the reception of the IR signal.

The controller 290 of the audio device 200 may be configured to use (e.g., execute) a position recognition module 281 to recognize whether the other device is positioned to the left or right of the audio device 200 in response to the IR signal received by the IR sensor 261.

Referring to FIG. 5, for example, in response to the reception of a signal by the second sensor 200-2 of the audio device 200a, the audio device 200a may recognize whether another audio device is positioned to the left of the audio device 200a. Accordingly, the audio device 200a may recognize that the audio device 200a is an audio device positioned to the right.

In response to the reception of the signal by the eighth sensor 200-8 of the audio device 200b, for example, the audio device 200b may recognize that another audio device is positioned to the right of the audio device 200b. Accordingly, the audio device 200b may recognize that the audio device 200b is an audio device positioned to the left.

Figure 4:
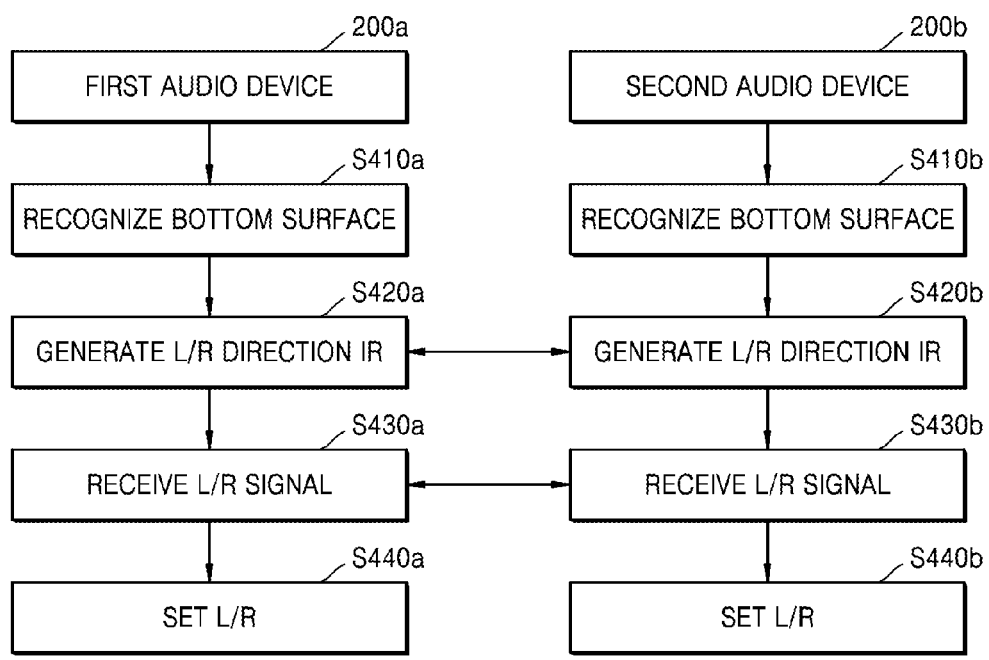
FIG. 4 is a flowchart illustrating an example position recognition method of an audio device.

FIG. 4 is a flowchart illustrating an example position recognition method of an audio device.

FIG. 5 is a diagram illustrating an example position recognition method of an audio device illustrated in FIG. 4.

Referring to FIG. 4, in step S410a, an audio device 200a recognizes a bottom surface.

Referring to FIGS. 2 and 5, since a first sensor 200-1 is positioned, for example, on the bottom surface of the audio device 200a, the first sensor 200-1 receives very weak light or receives almost no light although the first sensor 200-1 has emitted light. Accordingly, the audio device 200a may recognize that the audio device 200a is in contact with the bottom surface on the basis that almost no light is received from one of four IR sensors, for example, the first sensor 200-1.

In step S420a, the audio device 200a generates an L/R direction IR signal.

Referring to FIG. 5, a second sensor 200-2 which is one of IR sensors of the audio device 200a emits light, and also an eighth sensor 200-8 which is one of IR sensors of the audio device 200b emits light.

In step S430a, the audio device 200a receives an L/R signal.

Referring to FIG. 5, the second sensor 200-2 of the audio device 200a receives light reflected or emitted by the audio device 200b, and also the eighth sensor 200-8 of the audio device 200b receives light reflected or emitted by the audio device 200a.

In step S440a, the audio device 200a sets L/R.

Referring to FIG. 5, the audio device 200a may check that a signal is received from the second sensor 200-2 arranged to the left of the audio device 200a. Thus, since any signal is received from the left of the audio device 200a, the audio device 200a may recognize that there is another audio device to the left of the audio device 200a. Accordingly, the audio device 200a may recognize that the audio device 200a is an audio device arranged to the right and set the audio device 200a as a right audio device.

Similarly, the audio device 200b may check that a signal is received from the eighth sensor 200-8 arranged to the right of the audio device 200b. Thus, since any signal is received from the right of the audio device 200b, the audio device 200b may recognize that there is another audio device to the right of the audio device 200b. Accordingly, the audio device 200b may recognize that the audio device 200b is an audio device arranged to the left and set the audio device 200a as a left audio device.

Steps S410a to S440a may also be performed in steps S410b to S440b for the audio device 200b. Accordingly, the audio device 200a and the audio device 200b may recognize a respective left position and a respective right position by checking positions of each other within a very short time from a moment at which the bottom surface is recognized, for example, almost simultaneously.

According to an example embodiment, it is possible to reduce power consumption of an IR sensor for recognizing the position of the audio device by, instead of the IR sensor always being on, turning the IR sensor on when position recognition of the audio device is required while turning the IR sensor off normally.

Figure 6A:
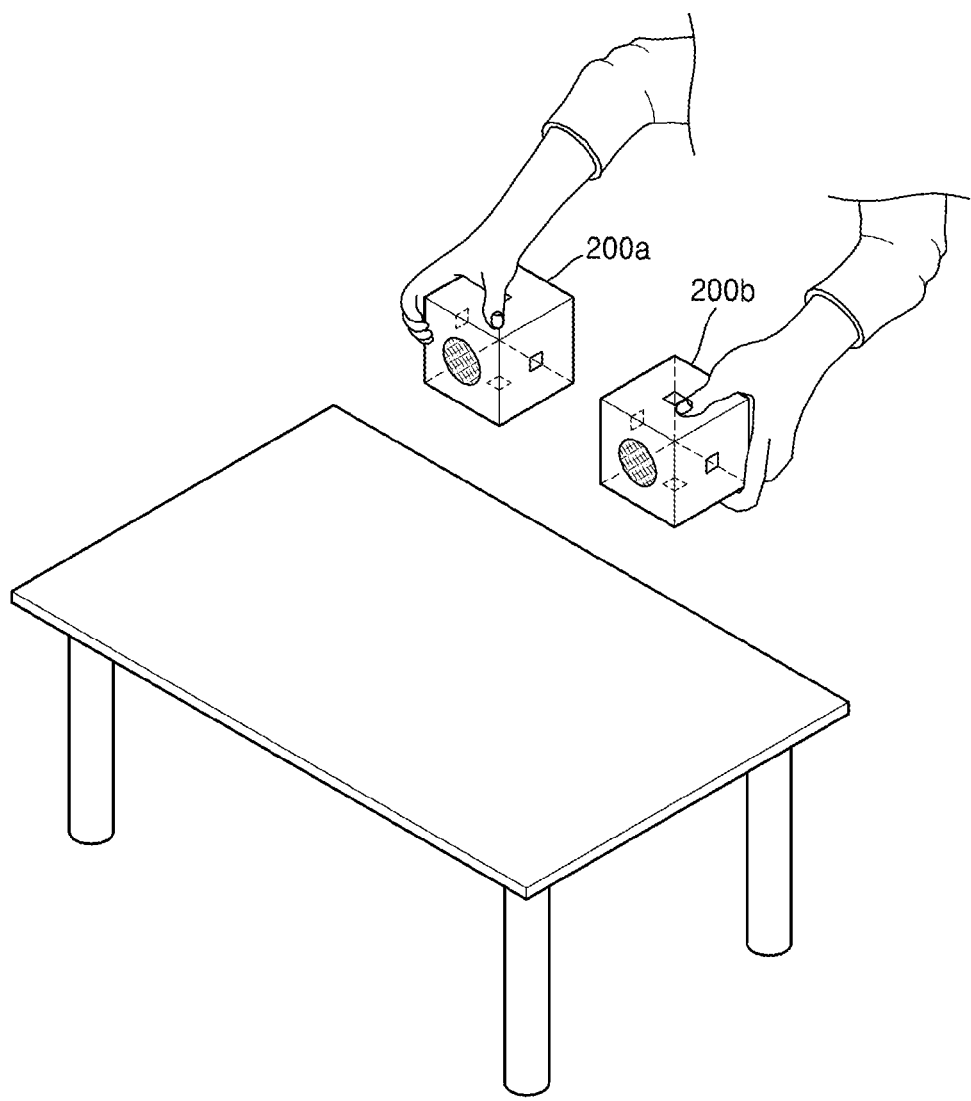
FIGS. 6A to 6D are diagrams illustrating an example position recognition method of an audio device for reducing power consumption.

FIG. 6A illustrates an example in which two audio devices are moved together.

Referring to FIG. 6A, a user moves an audio device 200a and an audio device 200b simultaneously and positions the audio devices 200a and 200b on a table. In this example, since the audio devices 200a and 200b are moving, on/off of an IR sensor may be controlled using such a movement. For example, when the user, who enjoyed sound in a master bedroom, wants to enjoy sound in a living room in a stereo mode by using the two audio devices 200a and 200b, the user may pick up and position the two audio devices 200a and 200b on a table in the living room. While the user enjoys sound in the master bedroom in the stereo mode using the two audio device 200a and 200b, both of the audio device 200a and the audio device 200b are in a stable state, and thus the IR sensors are left off. When the user picks up and positions the two audio devices 200a and 200b on the table in the living room, movement sensors of the audio devices 200a and 200b sense this movement, and the IR sensors are turned on. Accordingly, the audio devices 200a and 200b may recognize their respective left and right sides. When the left and right recognition is completed and the audio devices 200a and 200b are stabilized, the IR sensors of the audio devices 200a and 200b may be turned off to prevent power consumption.

Figure 6B:
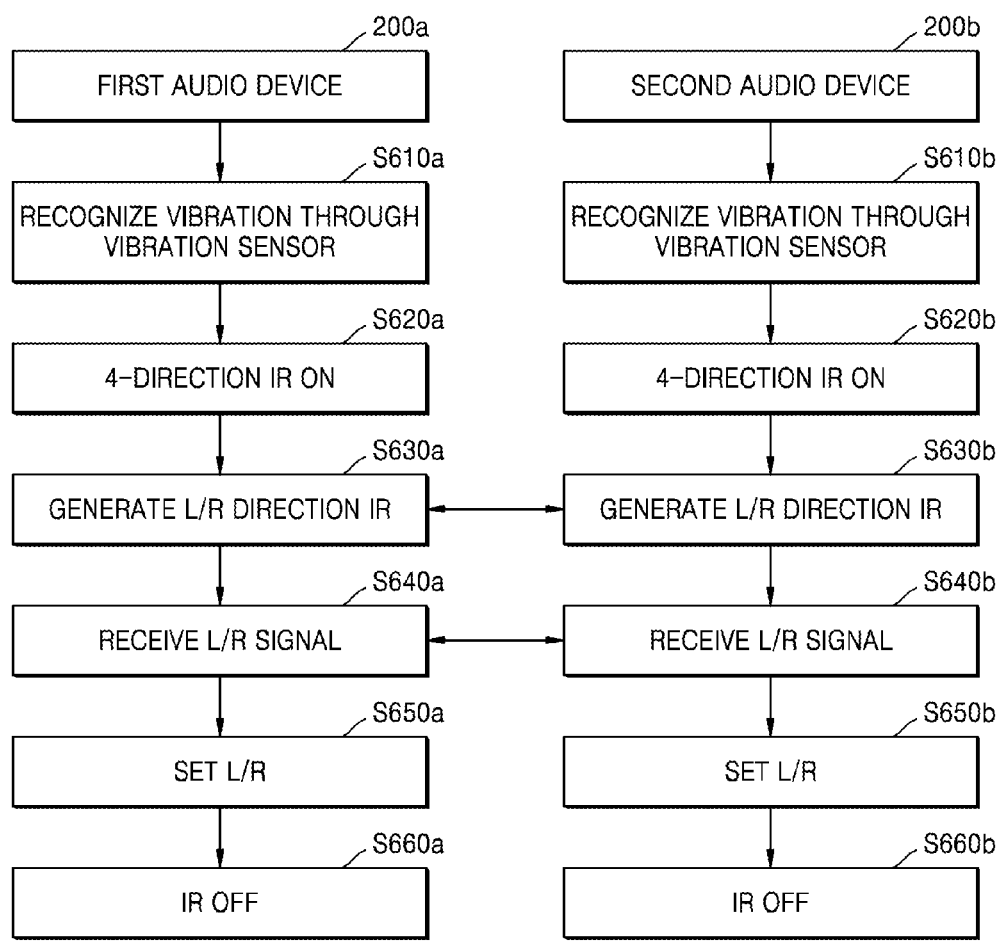

FIG. 6B is a flowchart illustrating an example position recognition method of an audio device. Operations illustrated in FIG. 6B are similar to the position recognition method of an audio device shown in FIG. 4. However, in order to reduce power consumption of the IR sensors, the IR sensors are turned on to operate only when the audio device moves and are turned off when the audio device is stabilized, instead of always leaving the IR sensors on.

Referring to FIG. 6B, in step S610a, an audio device 200a recognizes vibration using a vibration sensor as a sensor for sensing movement of the audio device 200a. A temperature sensor, a touch sensor, etc. may be used as the sensor for sensing the movement of the audio device 200a instead of the vibration sensor. Similarly, an audio device 200b may recognize vibration using a vibration sensor as a sensor for sensing movement of the audio device 200b in step S610b.

In step S620a, the audio device 200a turns on four directional IR sensors in response to the signal recognition of the vibration sensor. Similarly, the audio device 200b turns on four directional IR sensors in response to the signal recognition of the vibration sensor in step S620b.

In step S630a, the audio device 200a generates an L/R direction IR signal. Similarly, in step S630b, the audio device 200b generates an L/R direction IR signal.

Referring to FIG. 5, a second sensor 200-2 which is one of the IR sensors of the audio device 200a emits light, and also an eighth sensor 200-8 which is one of the IR sensors of the audio device 200b emits light.

In step S640a, the audio device 200a receives an L/R signal. Similarly, in step S640b, the audio device 200b receives an LR signal.

Referring to FIG. 5, the second sensor 200-2 of the audio device 200a receives light reflected by the audio device 200b, and also the eighth sensor 200-8 of the audio device 200b receives light reflected by the audio device 200a.

In step S650a, the audio device 200a sets L/R. Similarly, in step S650b, the audio device 200b sets L/R. This is similar to that described above with reference to FIG. 4

In step S660a, the audio device 200a turns off IR sensors 200-1 to 200-4. Similarly, in step S660b, the audio device 200b turns off IR sensors 200-5 to 200-8.

Thus, it is possible to reduce the waste of power consumed by the IR sensors by turning on an IR sensor and setting left and right positions only when the movement of the audio device is recognized and turning off the IR sensor when the audio device is stabilized.

For example, when the user picks up and positions the audio devices 200a and 200b in another room after the audio devices are stabilized, the audio device 200a and the audio device 200b sense vibration of the audio devices and turn on the IR sensors. Next, when the audio device 200a and the audio device 200b are positioned in another room, the audio device 200a and the audio device 200b may check positions of each other again and set the left and right sides. In addition, although not illustrated in FIG. 6, the audio devices 200a and 200b may further recognize whether the audio devices 200a and 200b are positioned on a bottom surface before the position recognition.

Figure 6C:
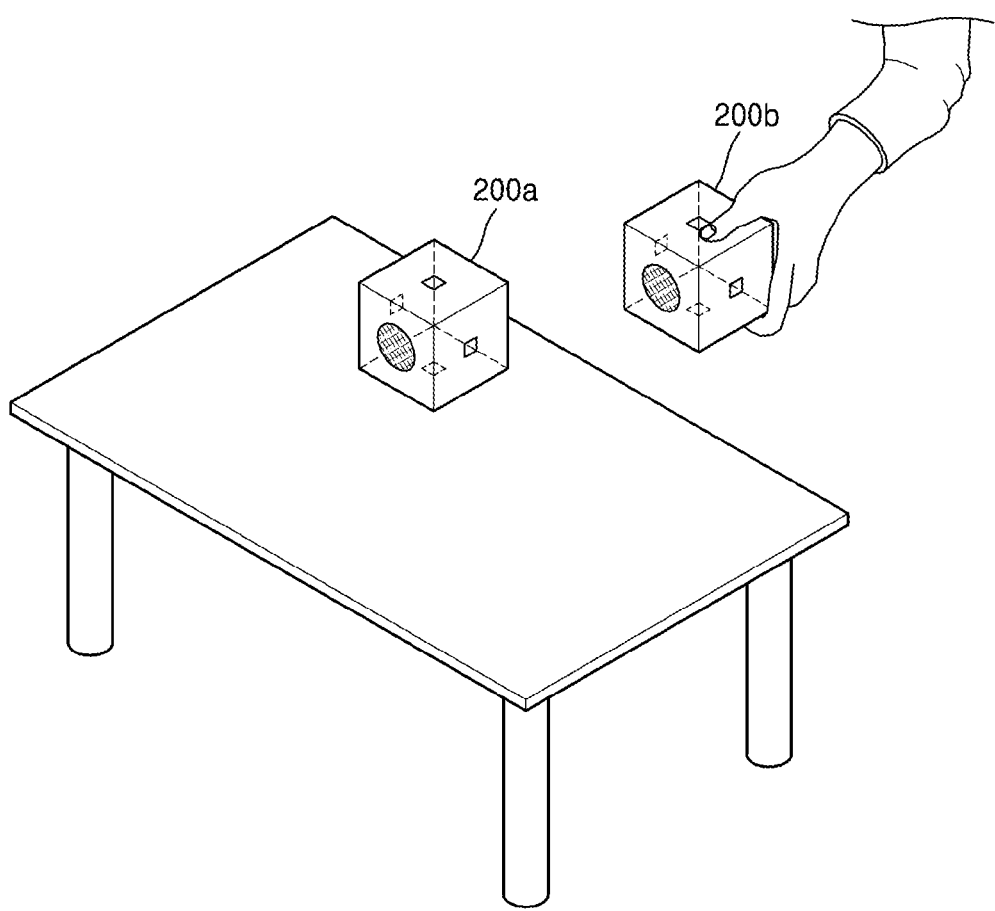

FIG. 6C illustrates an example in which one audio device is moved.

Referring to FIG. 6C, a user positions the audio device 200b on a table while the audio device 200a is not moved. For example, while the user enjoys sound in a mono mode using one audio device 200a in a living room, the user wants to move the audio device 200b that has been positioned in a master bedroom to the living room to enjoy sound in the living room in a stereo mode through the two audio devices 200a and 200b. When the user picks up the audio device 200b in the master bedroom and positions the audio device 200b on a table, BLE modules of the audio device 200a and the audio device 200b recognize each other, and thus IR sensors are turned on. Accordingly, the audio devices 200a and 200b may recognize their respective left and right sides. When the left and right recognition is completed and the audio devices 200a and 200b are stabilized, the IR sensors of the audio devices 200a and 200b may be turned off to prevent power consumption.

Figure 6D:
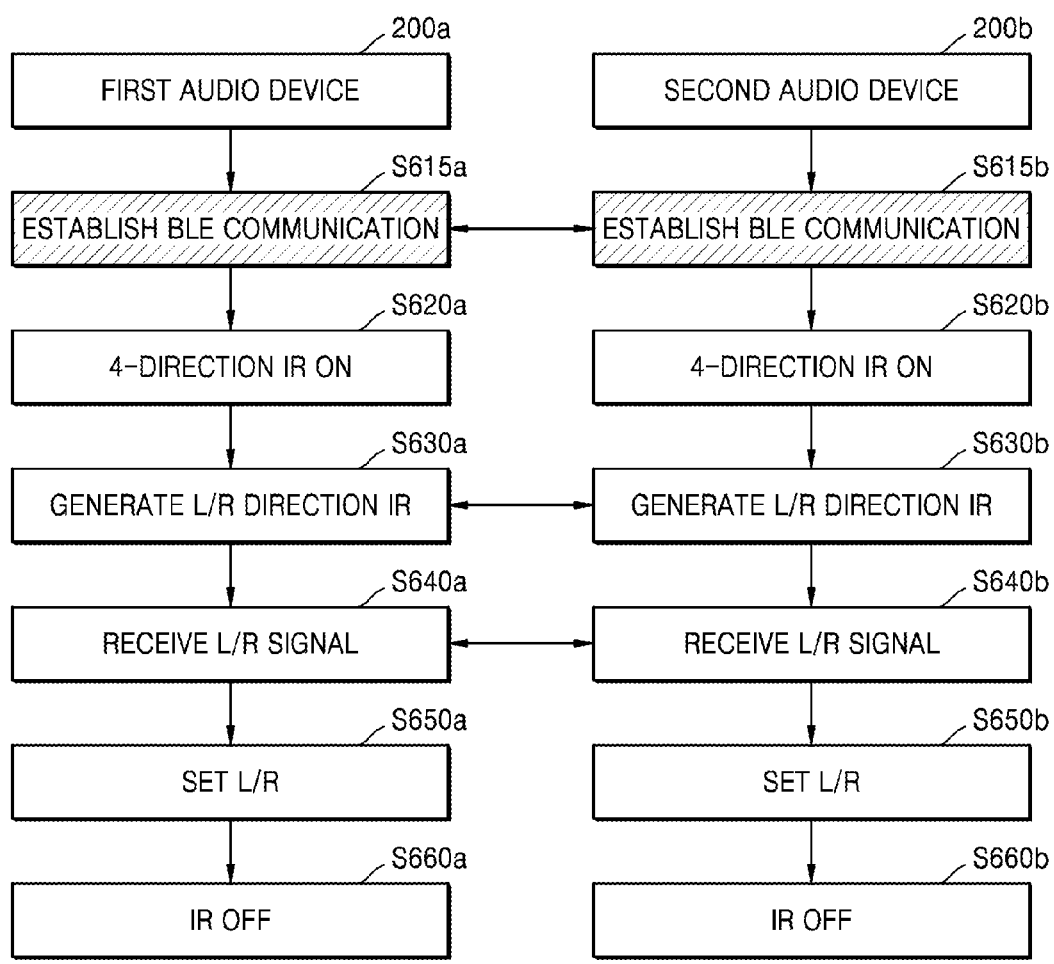

FIG. 6D is a flowchart illustrating an example position recognition method of an audio device. Operations illustrated in FIG. 6B are similar to the position recognition method of an audio device illustrated in FIG. 4. However, in order to save power consumption of the IR sensors, instead of the IR sensors always being on, the IR sensors are turned on to operate only when a nearby audio device is recognized through, for example, a BLE module of the audio device, and are turned off when the audio device is stabilized.

Referring to FIG. 6D, in steps S615a and S615b, BLE communication is established. The audio device 200a and the audio device 200b include respective BLE modules, which are always turned on. In general, the BLE communication includes a peripheral device (hereinafter referred to as a beacon) for performing broadcasting that informs its own presence to a nearby device at low cost by performing advertising at certain periods and a central device that performs scanning in response to the advertising. According to an example embodiment, any one of the audio devices 200a and 200b may serve as the peripheral device or the central device. One of the audio device 200a and the audio device 200b may perform advertising, and the other may perform scanning. Thus the audio device 200a and the audio device 200b may recognize each other.

In step S620a, the audio device 200a turns on four directional IR sensors on the basis that the nearby audio device 200b is recognized through the BLE module. Similarly, in step S620b, the audio device 200b turns on four directional IR sensors in response to the recognition of the nearby audio device 200a through the BLE module.

Steps after step S630a are the same as described above with reference to FIG. 6B, and thus their detailed description will be omitted.

Figure 7:
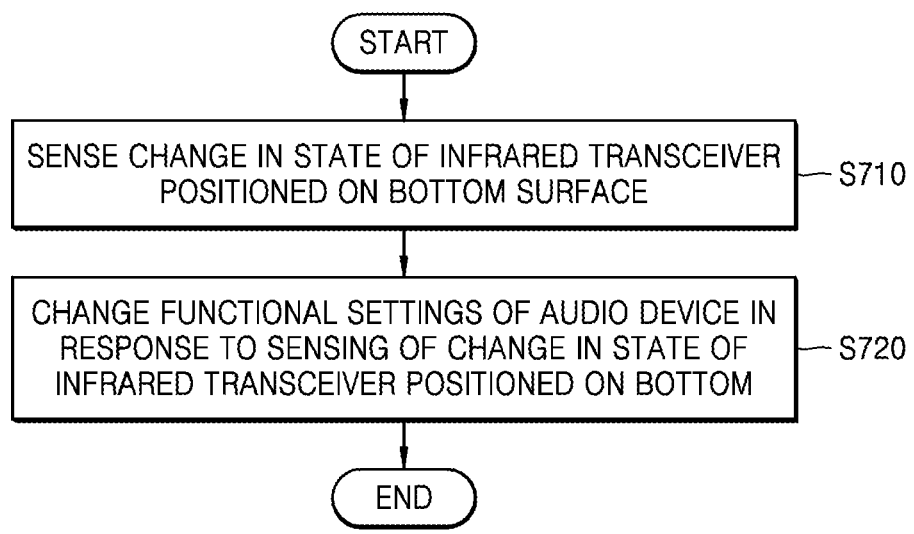
FIG. 7 is a flowchart illustrating an example function setting method of an audio device.

FIG. 7 is a flowchart illustrating an example function setting method of an audio device.

Referring to FIG. 7, in step S710, an audio device 200 senses the change in state of an IR transceiver positioned on a bottom. The IR sensor is a sensor that emits a certain amount of light and then senses an amount of light received. Thus, the amount of light received when the IR sensor is positioned on the bottom is different from the amount of light received when the IR sensor is positioned on a side surface. For example, as illustrated in FIG. 9A, the amount of light received from a first sensor 200-1 positioned on a bottom surface of the audio device 200a may be very small. However, when the first sensor 200-1 is positioned on a side surface of the audio device 200a by a user rotating the audio device 200a, the amount of light received may increase. Accordingly, when a state value corresponding to the amount of light received when the first sensor 200-1 is positioned on the bottom surface is referred to as a first value, and a state value corresponding to the amount of light received when the first sensor 200-1 is positioned on the side surface is referred to as a second value, the audio device 200a may recognize that the audio device 200a is rotated by recognizing a change in the state value of the first sensor from the first value to the second value.

The controller 290 of the audio device 200 may use or execute the function setting module 282 to sense the change in state of the IR transceiver positioned on the bottom.

In step S720, the audio device 200 changes functional settings for the audio device 200 in response to the sensing of the change in state of the IR transceiver positioned on the bottom.

When the function setting module 282 senses the change in state of the IR transceiver positioned on the bottom of the audio device 200, the function setting module 282 may use the function setting table 283 to change functional settings for the audio device 200.

Changeable functional settings of the audio device may be determined in various ways. The changeable functional settings of the audio device may be determined in various ways such as change of an input source, change of a sound stage, or volume up/down.

For example, when the state value of the IR sensor positioned on the bottom surface of the audio device 200 is changed and the audio device 200 is rotated by 90 degrees once, the input source for the audio device 200 may be changed to TV. Next, when the state value of the IR sensor positioned on the bottom surface of the audio device 200 is changed again, that is, when the audio device 200 is rotated by 90 degrees again, the input source for the audio device 200 may be changed from TV to smart device.

Figure 8:
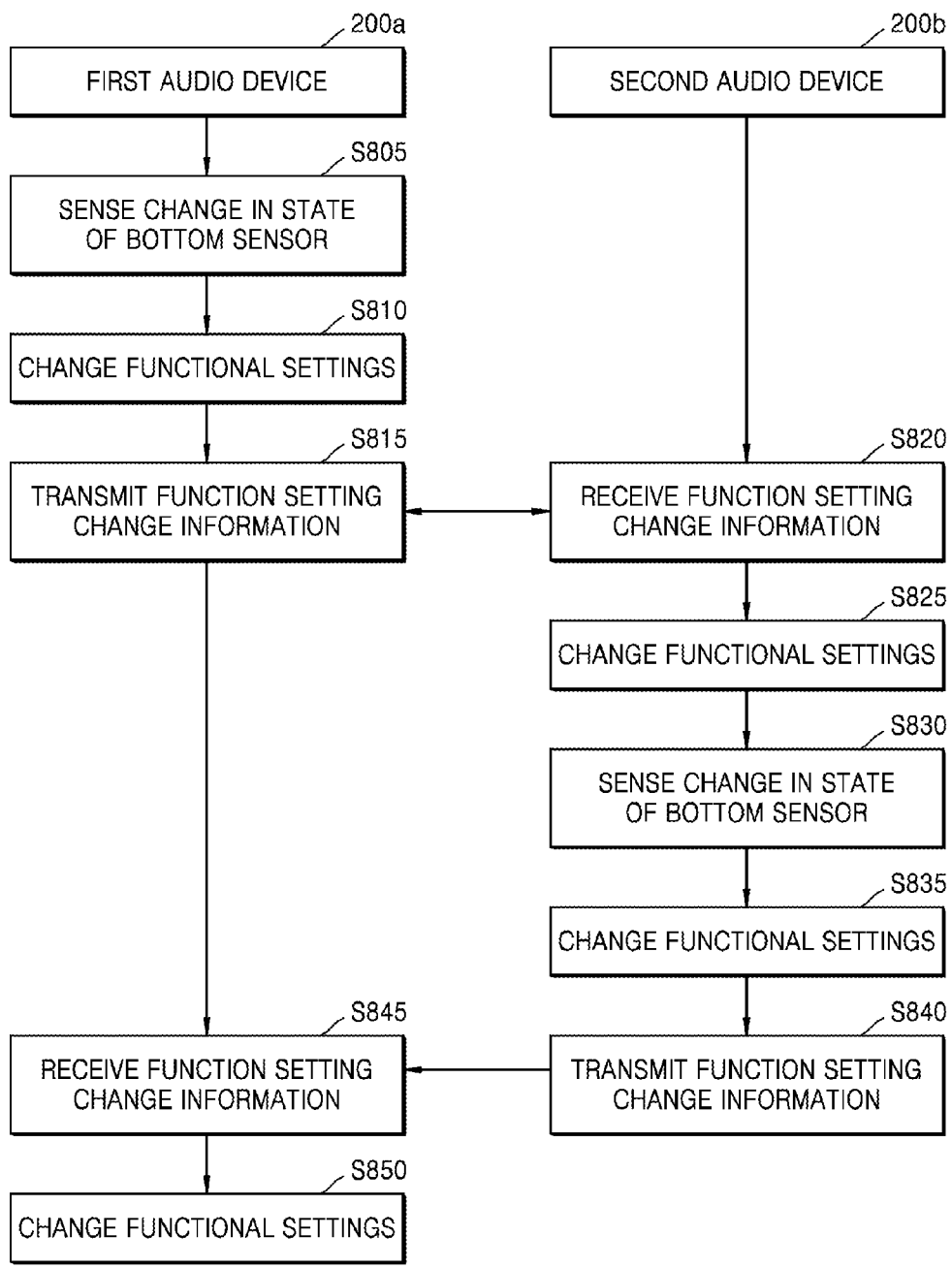
FIG. 8 is a flowchart illustrating an example function setting method of an audio device.

FIG. 8 is a flowchart illustrating an example function setting method of an audio device.

FIGS. 9A to 9D are diagrams illustrating an example function changing method of an audio device illustrated in FIG. 8.

The function changing method of an audio device according to an example embodiment will be described below with reference to FIG. 8 and FIGS. 9A to 9D.

Referring to FIG. 8, in step S805, an audio device 200a senses a change in state of an IR sensor positioned on a bottom surface.

Figure 9B:
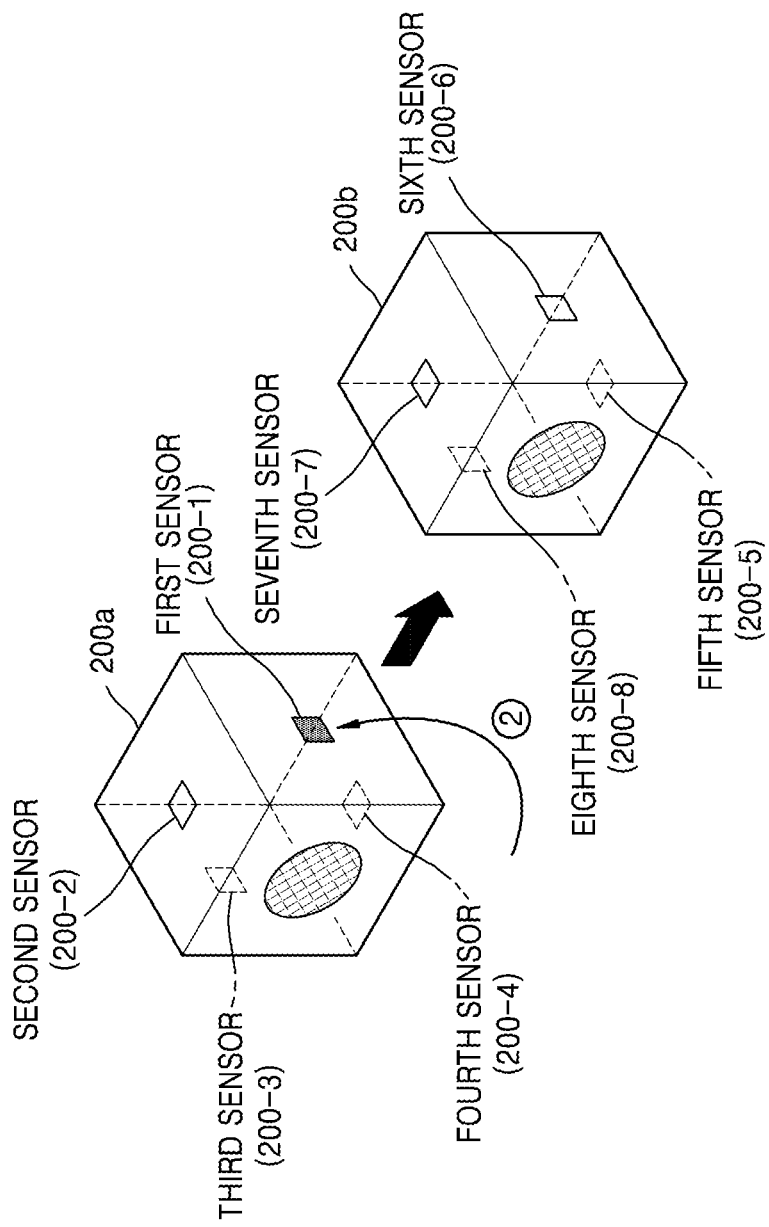

Referring to FIG. 9A, a first sensor 200-1 is positioned on the bottom surface of the audio device 200a. When a user picks up and rotates the audio device 200a by 90 degrees (①), as illustrated in FIG. 9B, the first sensor 200-1 is positioned on the side surface of the audio device 200a. The amount of light sensed when the IR sensor is in contact with the bottom surface not to receive light from the outside and the amount of light sensed when the IR sensor is positioned on the side surface of the audio device 200a to receive light from the outside are different from each other. Accordingly, the state of the IR sensor 200-1 is changed from a first state to a second state. In this way, the audio device 200a may sense the change in state of the IR sensor 200-1.

In step S810, the audio device 200a changes functional settings of the audio device 200a in response to the sensing of the change in state of the IR sensor positioned on the bottom surface.

The audio device 200a may sense the change in state of the IR sensor 200-1 positioned on the bottom surface and may change the functional settings of the audio device 200a with reference to a function setting table 283 as illustrated in FIGS. 10A and 10B.

FIGS. 10A and 10B illustrate an example function setting table.

Referring to FIG. 10A, a first function setting table is illustrated.

In FIG. 10A, an input source that is set corresponding to a change in state of a bottom IR sensor is displayed. Referring to FIG. 10A, the input source is changed to TV in accordance with a first state change of the bottom IR sensor, and the input source is changed from TV to smart device in accordance with a next second state change of the bottom IR sensor. The input source is changed from smart device to BT ready in accordance with a next third state change of the bottom IR sensor. The input source is changed from BT Ready to Internet radio in accordance with a next fourth state change of the bottom IR sensor. For example, the first state change, the second state change, the third state change, and the fourth state change denote the change in state of the IR sensor positioned on the bottom surface. Accordingly, the first state change occurs when the audio device is rotated by 90 degrees in which a first sensor is moved from the bottom surface to a side surface, and the second state change occurs when the audio device is further rotated by 90 degrees in which a second sensor is moved from the bottom surface to the side surface.

In FIG. 10B, a sound stage that is set corresponding to a change in state of a bottom IR sensor is displayed. Referring to FIG. 10B, the sound stage is changed to voice in accordance with a first state change of the bottom IR sensor, and the sound stage is changed from voice to music in accordance with a next second state change of the bottom IR sensor. The sound stage is changed from music to movie in accordance with a next third state change of the bottom IR sensor. The sound stage is changed from movie to 3D sound in accordance with a next fourth state change of the bottom IR sensor.

It should be understood by those skilled in the art that a table for variously changing functional settings may be considered in addition to the input source shown in FIG. 10A or the sound stage shown in FIG. 10B.

For example, the audio device 200a may sense a change in state of the IR sensor 200-1 positioned on the bottom surface and may set the input source of the audio device 200a to TV with reference to the function setting table as illustrated in FIG. 10A.

In step S815, the audio device 200a transmits function setting change information to the audio device 200b.

When the function of the audio device 200a set as a right device is changed, the same function setting may be applied to a left device. Thus, the audio device 200a transmits, to the audio device 200b, the function setting change information, that is, information for informing that the input source has been set to TV. Referring to FIG. 9B, in this example, the audio device 200a may transmit the function setting change information to the audio device 200b through the first sensor 200-1 positioned at the side surface of the audio device 200a.

In step S820, the audio device 200b receives the function setting change information from the audio device 200a.

The audio device 200b may receive the function setting change information from the audio device 200a through the eighth sensor 200-8 positioned at the side surface.

In step S825, the audio device 200b changes functional settings.

The audio device 200b may set an input source of the audio device 200b as TV with reference to the function setting change information received from the audio device 200a.

Figure 9C:
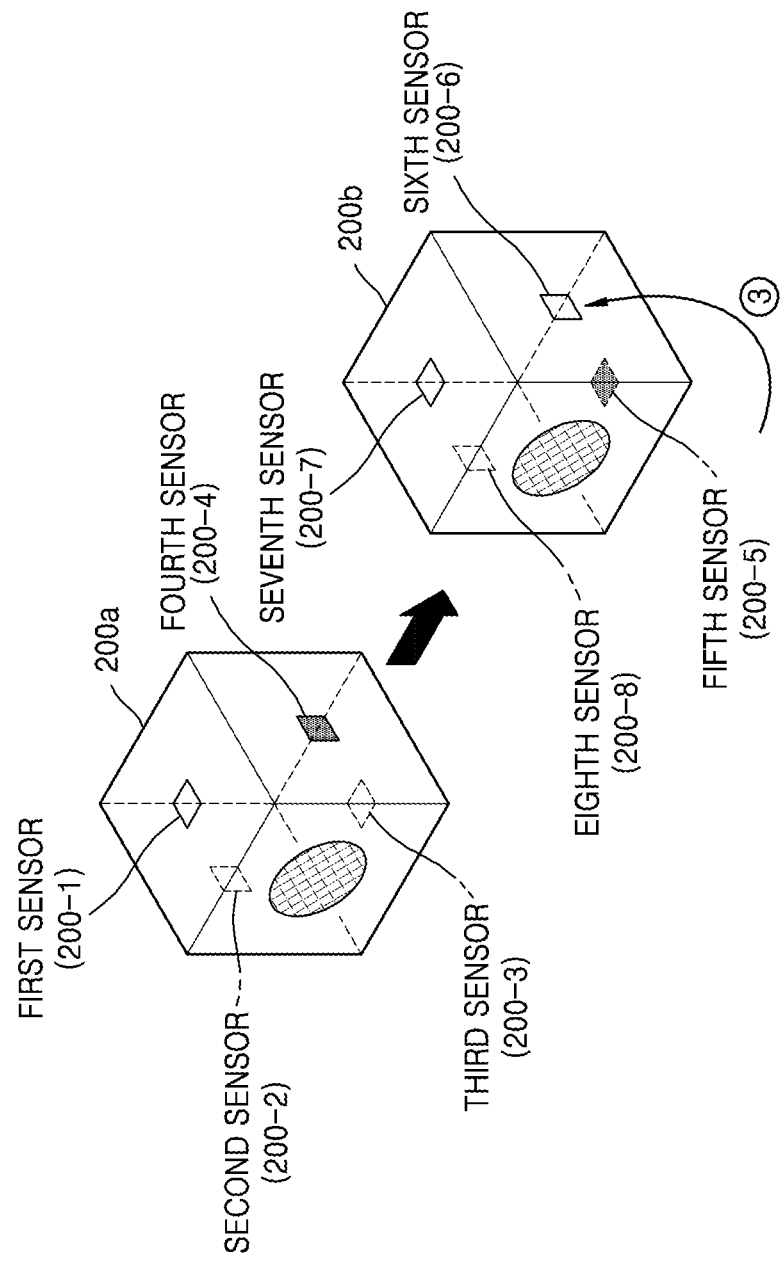
Figure 9D:
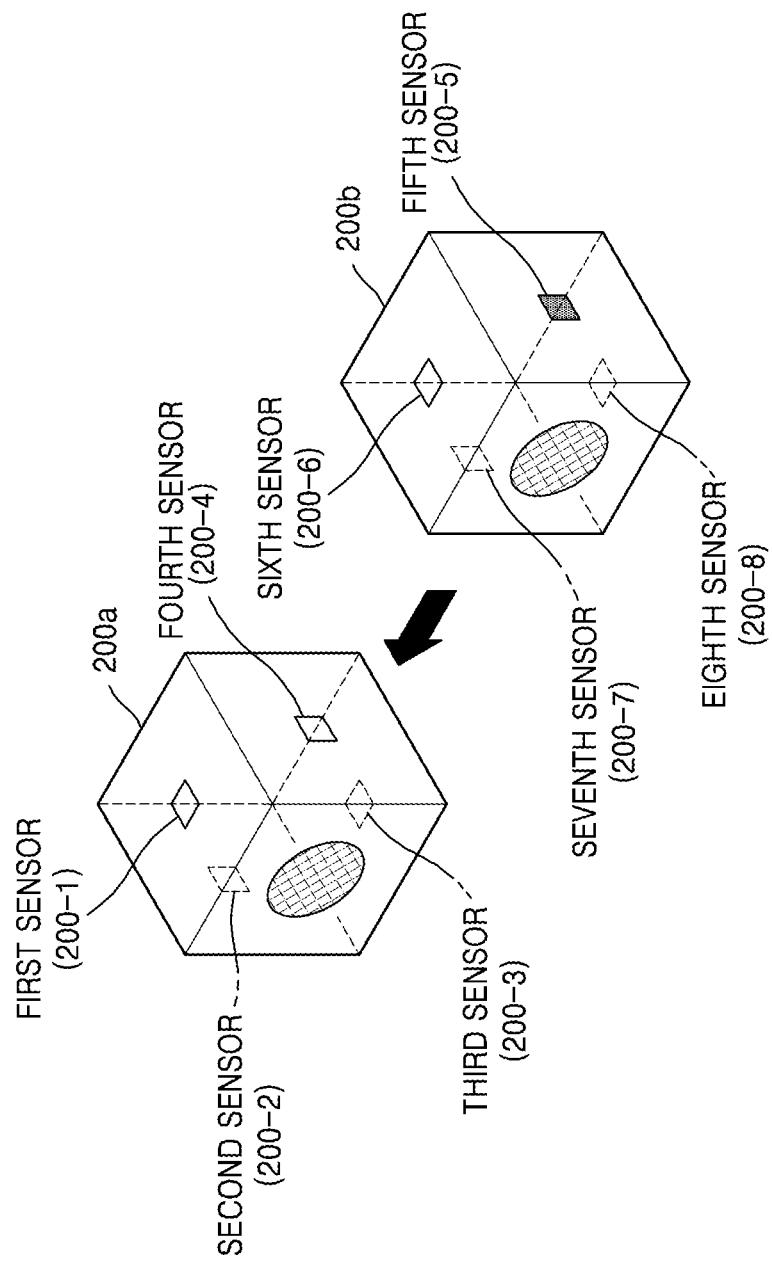

For example, when the audio device 200a is rotated by 90 degrees again from a state illustrated in FIG. 9B(②), a fourth sensor positioned on the bottom surface is positioned on the side surface of the audio device 200a as shown in FIG. 9C. Accordingly, the state of the fourth sensor positioned on the bottom surface is changed from the first state value to the second state value. In response to the change in state of the bottom surface, the audio device 200a may change the input source of the audio device 200a from TV to smart device with reference to the first function setting table shown in FIG. 10A. Likewise, the audio device 200a may transmit the function setting change information to the audio device 200b.

In step S830, the audio device 200b senses the change in state of the IR sensor positioned on the bottom surface of the audio device 200b.

In FIG. 9C, a fifth sensor 200-5 is positioned on the bottom surface of the audio device 200b. In this situation, when the user rotates the audio device 200b by 90 degrees(③), the audio device 200b may sense the change in state of the fifth sensor 200-5 positioned on the bottom surface of the audio device 200b.

In step S835, the audio device 200b changes functional settings of the audio device 200b in response to the sensing of the change in state of the IR sensor positioned on the bottom surface of the audio device 200b.

Like the audio device 200a, the audio device 200b may also change functional settings of the audio device 200b in response to the sensing of the change in state of the IR sensor positioned on the bottom surface. In this example, among the function setting tables illustrated in FIGS. 10A and 10B, the first function setting table is used by the audio device 200a. Accordingly, the audio device 200b may change functional settings with reference to another table, that is, a second function setting table.

For example, when the audio device 200b receives the function setting change information from the audio device 200a, the audio device 200b may be aware that the first function setting table is used by the audio device 200a, and thus may use another function setting table.

The audio device 200b may change the sound stage of the audio device 200b to voice corresponding to the first state change with reference to the second function setting table.

In step S840, the audio device 200b transmits the function setting change information of the audio device 200b to the audio device 200a.

Like step S815, the audio device 200b may transmits the function setting change information indicating that the sound stage is changed to voice to the audio device 200a through a seventh sensor 200-7 positioned on the side source of the audio device 200b.

In step S845, the audio device 200a receives the function setting change information from the audio device 200b. In step S850, the audio device 200a changes the functional settings.

The audio device 200a may receive the function setting change information from the audio device 200b through a fourth sensor 200-4 and may change the sound stage of the audio device 200a to voice with reference to the function setting change information.

When two audio devices, that is, the audio device 200a and the audio device 200b, are used in the operation method as illustrated in FIG. 8, the input source of the audio devices may be changed by rotating the audio device 200a, and the sound stage of the audio devices may be changed by rotating the audio device 200b.

FIG. 11 illustrates another example of an audio device including an IR sensor.

Referring to FIG. 11, an audio device 200c and an audio device 200d are formed in a cylindrical shape. By including an IR sensor in a first, second, third, and fourth direction of the cylindrical audio device, the audio device 200c and the audio device 200d may recognize that the audio devices are positioned to the left or right of each other. In addition, in order to implement a non-directional audio device, the audio device 200c may make a groove in each of an upper portion 1100a of the cylinder and a lower portion 1110a of the cylinder, and may output sound through the groove. Similarly, the groove for outputting sound to each of the upper portion 1100b of the cylinder and the lower portion 1110b of the cylinder is also provided to the audio device 200d.

In an example illustrated in FIG. 11, the audio device 200c and the audio device 200d are shown to include four directional IR sensors 200-1 to 200-4 and four directional IR sensors 200-5 to 200-8, respectively.

According to an example embodiment, an IR sensor may be further installed in a bottom surface of the cylindrical audio device, and thus the cylindrical audio device may recognize that the cylindrical audio device is positioned on a bottom surface.

Figure 12:
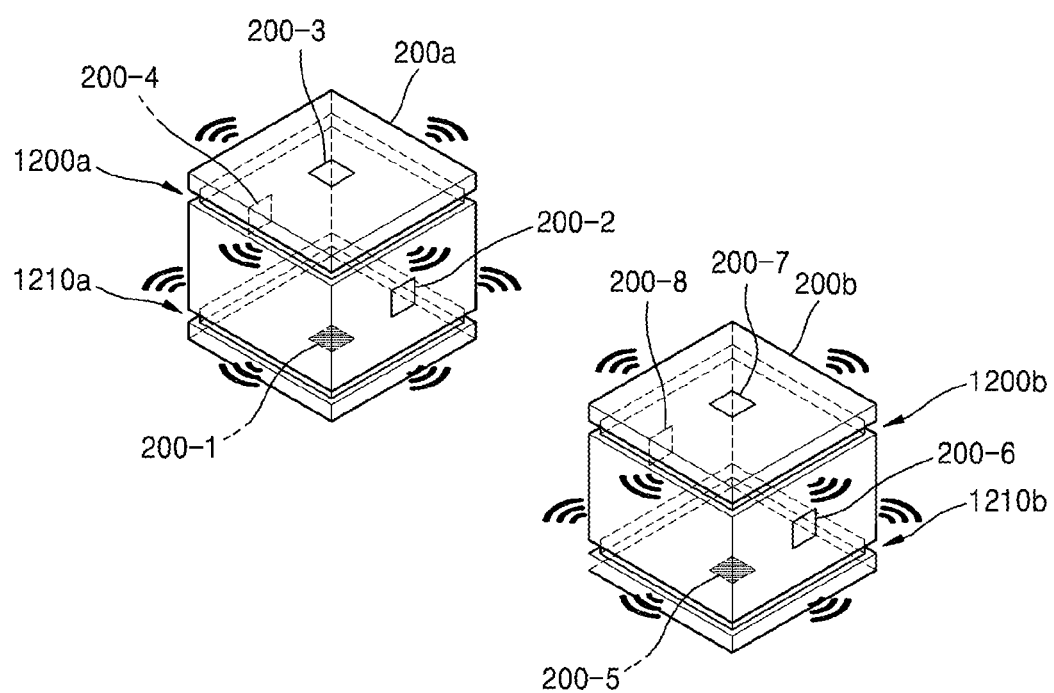
FIG. 12 is a diagram illustrating an example audio device.

FIG. 12 illustrates another example of an audio device including an IR sensor.

The audio device shown in FIG. 12 is similar to the audio device illustrated in FIG. 9A, but instead of outputting sound in one direction, it outputs sound in four directions in order to implement an non-directional audio device.

Referring to FIG. 12, a hexahedral audio device 200a includes a four-directional groove 1200a provided in an upper portion and a four-directional groove 1210a provided in a lower portion. Similarly audio device 200b of FIG. 12 includes grooves 1200b and 1210b. Since the sound is output through the four-directional grooves, a user may position the audio device without needing to worry about a front or rear of the audio device.

Figure 13:
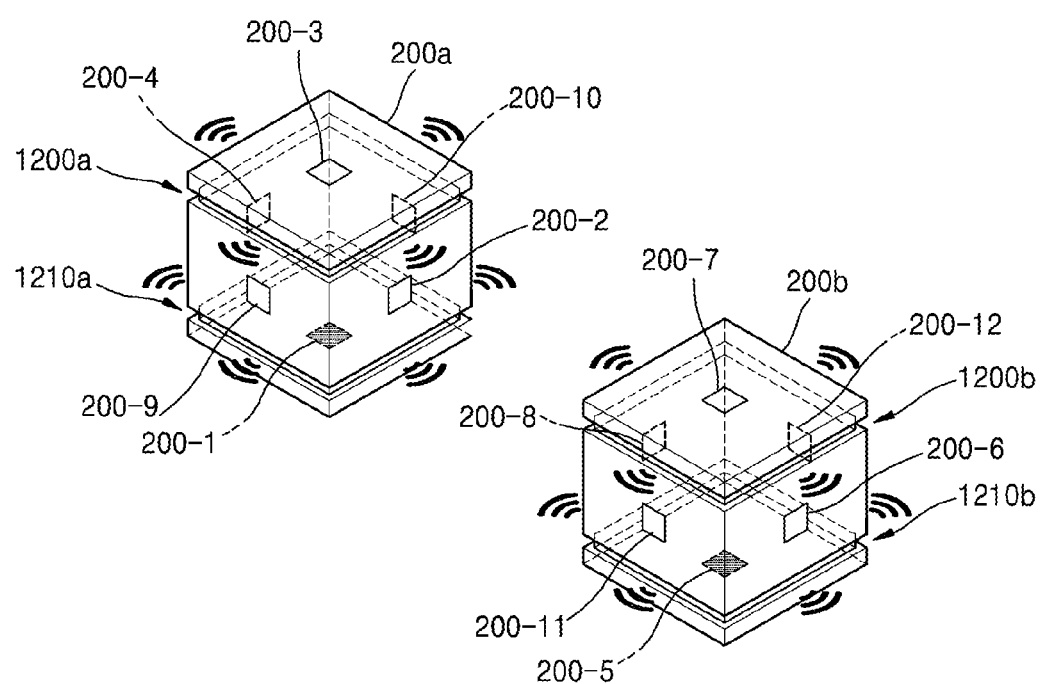
FIG. 13 is a diagram illustrating an example audio device.

FIG. 13 illustrates another example of an audio device including an IR.

The audio device illustrates in FIG. 13 is similar to the audio device shown in FIG. 12, but further includes IR sensors at front and rear sides in order to further realize non-directionality. Referring to FIG. 13, an audio device 200a further includes IR sensors 200-9 and 200-10, and an audio device 200b further includes IR sensors 200-11 and 200-12. In such an audio device, sound may be output in four directions, and also a user may position the audio device irrespective of the bottom surface of the audio device or the direction in which the audio device is positioned.

According to the example embodiments disclosed in the present disclosure, it is possible for a user to set left and right positions of the wireless audio device not manually but automatically and simply.

According to the example embodiments disclosed in the present disclosure, it is also possible to simply manipulate functional settings of the audio device only by a position change such as rotation of the audio device.

The position recognition method of the audio device according to an example embodiment may be implemented as program instructions executable by a variety of computers and recorded on a computer-readable medium. The computer-readable medium may also include a program instruction, a data file, a data structure, or combinations thereof. The program instructions recorded on the media may be designed and configured specially for the example embodiments or be known and available to those skilled in computer software. Examples of the computer-readable medium include a magnetic medium, such as a hard disk, a floppy disk, and a magnetic tape, an optical medium, such as a compact disc read-only memory (CD-ROM), a digital versatile disc (DVD), etc., a magneto-optical medium such as a floptical disk, and a hardware device specially configured to store and perform program instructions, for example, a ROM, random access memory (RAM), flash memory, etc. Examples of the program instructions include machine codes made by, for example, a compiler, as well as high-level language codes executable by a computer, using an interpreter.

In the preceding description, the present disclosure and its advantages have been described with reference to various example embodiments. However, it should be apparent to a person of ordinary skill in the art that various modifications and changes can be made, without departing from the scope of the present disclosure, as set forth in the claims below. Accordingly, the description and figures are to be regarded as illustrative examples of the present disclosure, rather than in restrictive sense. All such possible modifications are intended to be included within the scope of the present disclosure.

What is claimed is:

1. An audio device comprising:
    at least one infrared (IR) transceiver; and
    a controller configured to determine whether the audio device is positioned to a left or right of another audio device in response to a signal received by the at least one IR transceiver.

2. The audio device of claim 1, further comprising a movement sensor configured to sense movement of the audio device,
    wherein the controller is configured to turn on the at least one IR transceiver in response to a signal indicating that the movement sensor senses movement of the audio device.

3. The audio device of claim 1, wherein,
    the at least one IR transceiver includes a first IR transceiver and a second IR transceiver, and
    the controller is configured to determine that the audio device is positioned on a surface using the first IR transceiver positioned on the bottom surface of the audio device, and to determine that the audio device is positioned to a left or right of the other audio device based on the second IR transceiver receiving a signal.

4. The audio device of claim 3, wherein the controller is configured to change settings of a function of the audio device in response to a change in a state of a signal sensed by the first IR transceiver positioned on the bottom surface of the audio device.

5. The audio device of claim 4, wherein the function includes one or more of a change of an input source, a change of a sound stage, and a volume up/down of the audio device.

6. A position recognition method of an audio device, the position recognition method comprising:
    receiving a signal by at least one infrared (IR) transceiver included in the audio device; and
    determining whether the audio device is positioned to a left or right of another audio device in response to the received signal.

7. The position recognition method of claim 6, further comprising receiving a signal indicating sensing a movement of the audio device; and turning on the at least one IR transceiver in response to the signal indicating sensing the movement.

8. The position recognition method of claim 6, wherein,
    the at least one IR transceiver includes a first IR transceiver and a second IR transceiver, and
    the position recognition method further comprises:
    determining that the audio device is positioned on a surface using the first IR transceiver positioned on the bottom surface of the audio device, and
    determining that the audio device is positioned to a left or right of the other audio device based on the second IR transceiver receiving a signal.

9. The position recognition method of claim 8, further comprising changing settings of a function of the audio device in response to a change in a state of a signal sensed by the first IR transceiver positioned on the bottom surface of the audio device.

10. The position recognition method of claim 9, wherein the function includes one or more of a change of an input source, a change of a sound stage, and a volume up/down of the audio device.

11. A non-transitory computer-readable recording medium having recorded thereon a program which, when executed, causes the audio device to perform operations recited in claim 6.

* * * * *